Patented Dec. 26, 1922.

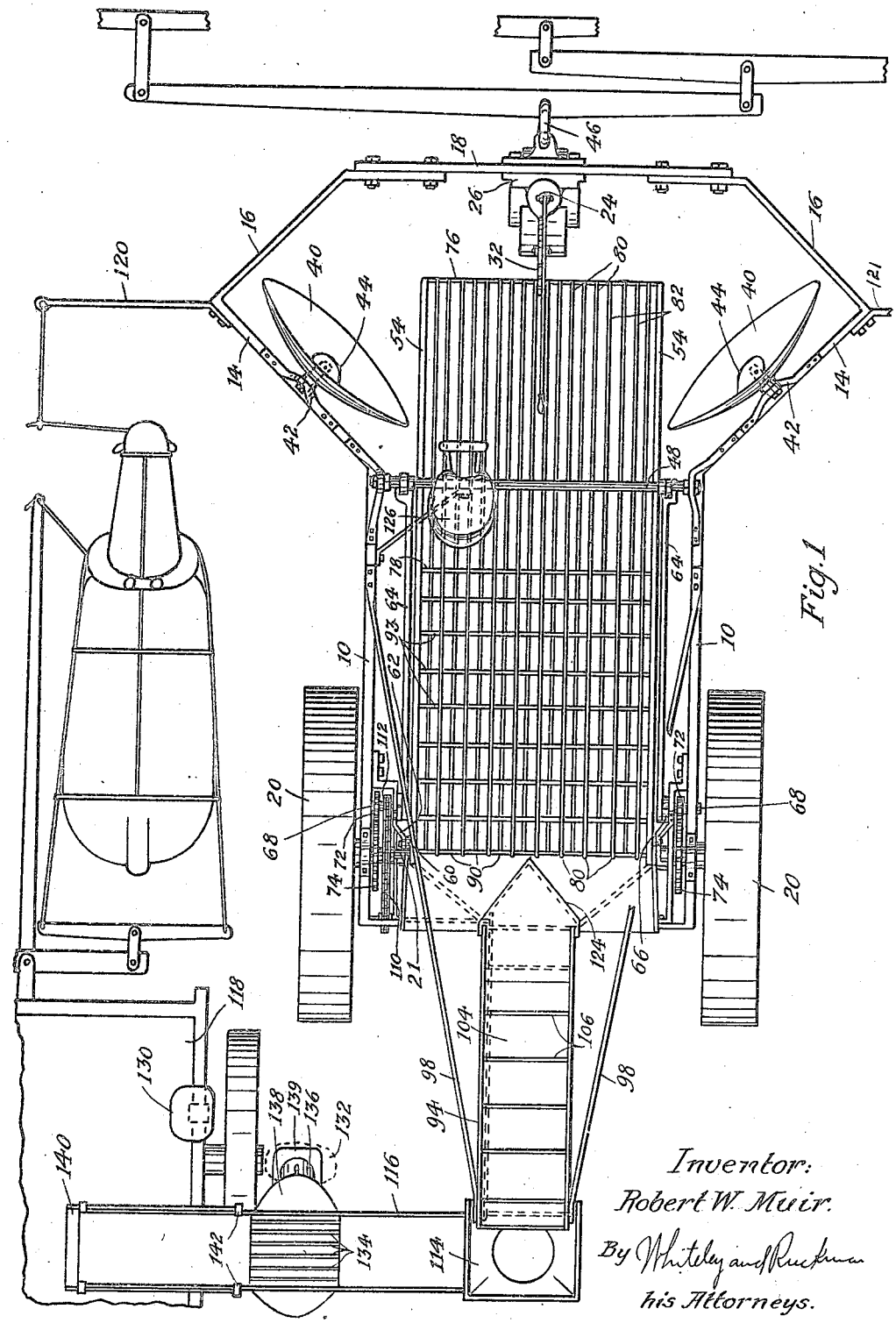

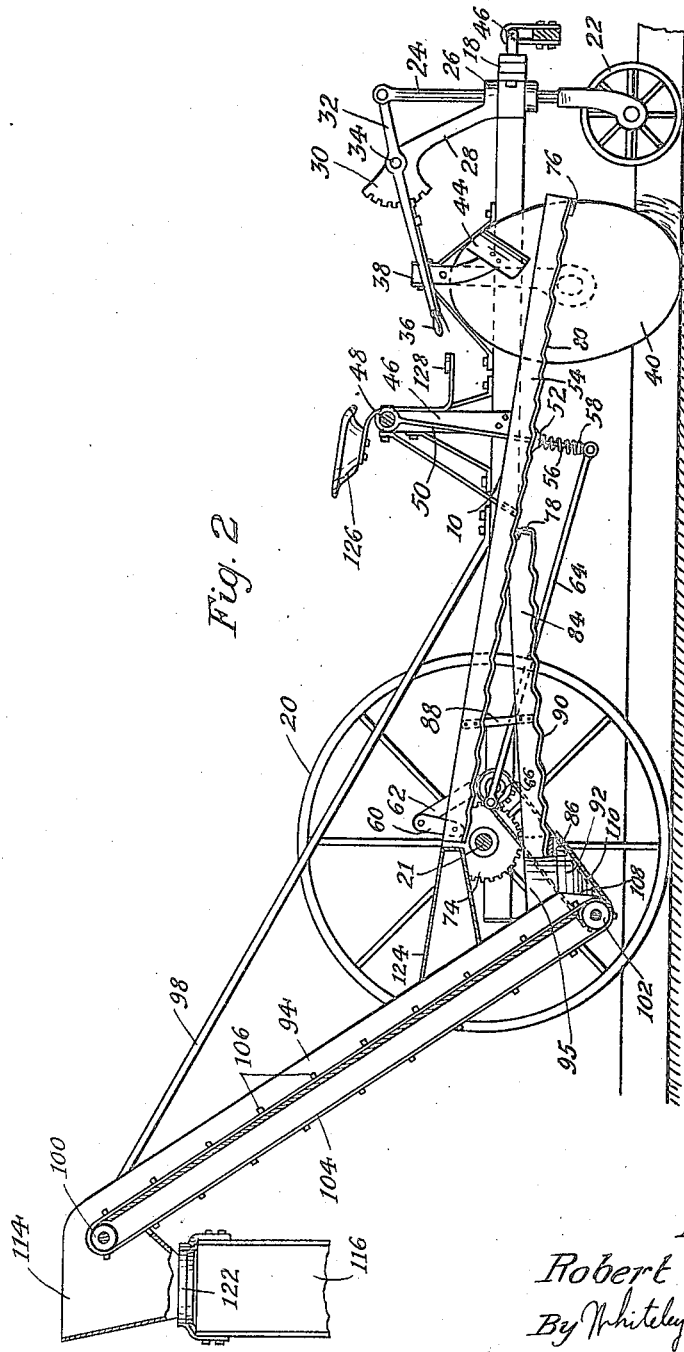

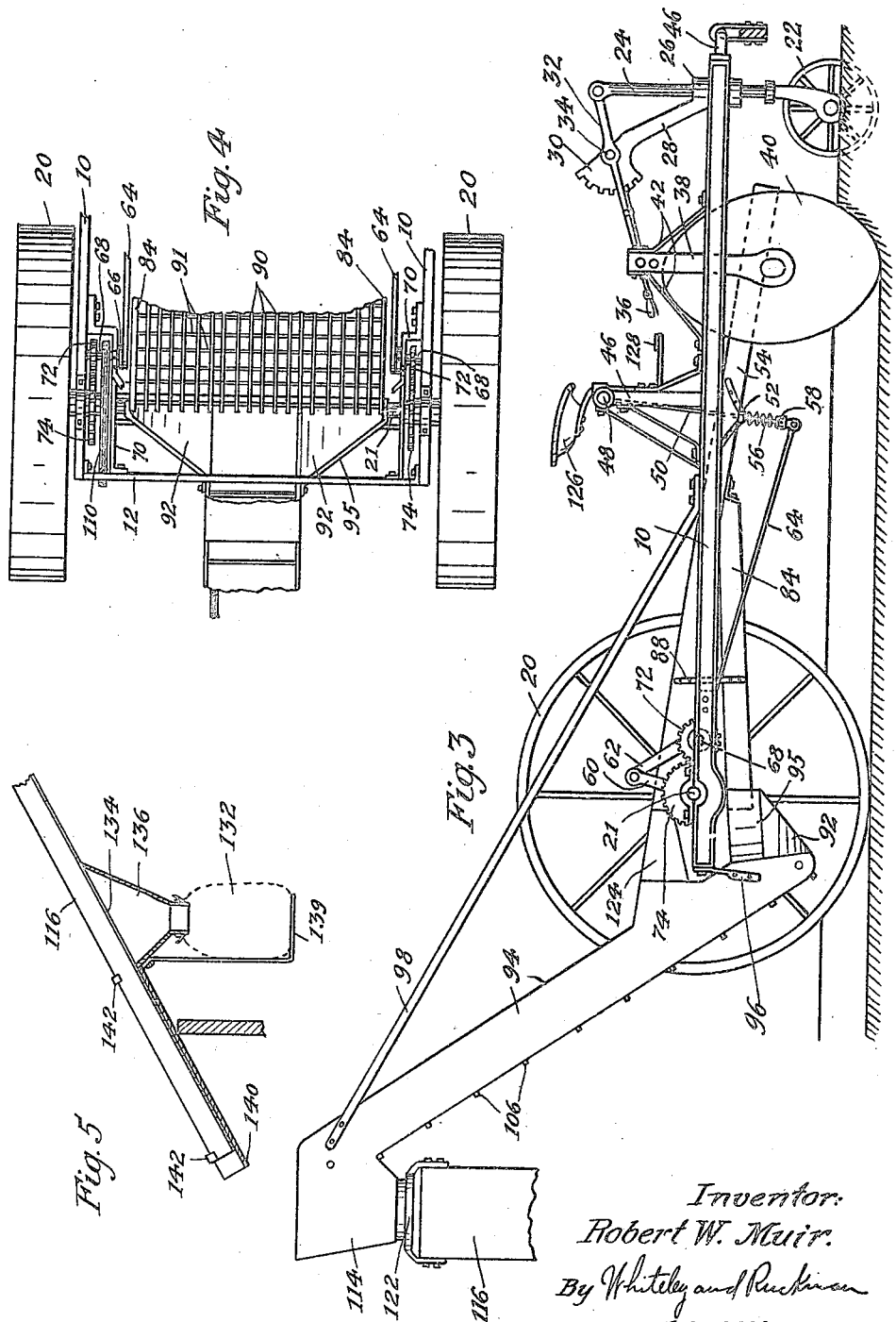

1,440,232

UNITED STATES PATENT OFFICE.

ROBERT W. MUIR, OF HUNTER, NORTH DAKOTA.

POTATO HARVESTER.

Application filed April 7, 1919. Serial No. 287,930.

*To all whom it may concern:*

Be it known that I, ROBERT W. MUIR, a citizen of the United States, residing at Hunter, in the county of Cass and State of North Dakota, have invented certain new and useful Improvements in Potato Harvesters, of which the following is a specification.

My invention relates to potato harvesters and the object is to provide a machine of this character which will lift the potatoes out of the ground, and without any manual handling and without bruising or otherwise injuring them, will free the potatoes from vines, weeds and dirt and deliver the potatoes to a wagon traveling in proximity to the harvester. Another object is to provide a machine in which the potatoes are freed from the soil which is dug up therewith by a shaking action which varies proportionately to the amount of material which is dug up.

The full objects and advantages of my invention will appear in connection with the detailed description thereof and the novel features embodied in my inventive idea are particularly pointed out in the claims.

Referring to the accompanying drawings, which illustrate the application of my invention in one form,—

Fig. 1 is a top plan view. Fig. 2 is a view mostly in longitudinal vertical section. Fig. 3 is a side view having one of the rear wheels removed. Fig. 4 is a detail plan view having the top grate bars removed. Fig. 5 is a sectional view of the delivery chute.

As shown in the drawings, the frame of the machine consists of longitudinally-extending side members or bars 10 connected at the rear by a transverse bar 12, while at the front the members 10 have attached thereto outwardly-inclined members 14. To the front of the members 14 are attached inwardly-inclined members 16 which are secured to a front transverse bar 18. The rear of the frame is supported by wheels 20 secured to an axle 21 journaled in the frame. The front of the frame is supported at its middle by a small wheel 22 rotatably mounted in the lower forked end of a rod 24, said rod extending slidably through a casting 26 secured to the bar 18. The casting is provided with a rearwardly and upwardly extending arm 28 having a notched segment 30. A lever 32 pivoted to the arm at 34 has its front end pivotally connected to the upper end of the rod 24 while its rear end is provided with a handle 36 and also the customary operating device for a pawl engageable with the notches of the segment 30. By means of this lever and pawl operating device the height of the front end of the frame may be adjusted and the frame thus held in any desired position. Secured to the inclined members 14 are vertical bars 38 in the lower ends of which are journaled disk plows 40. The upper ends of the bars 28 are provided with braces 42 and scrapers 44 for removing soil from the plows. To the front of the frame is attached a clevis 46, and whiffletrees are shown attached to this clevis, and to which horses may be attached for pulling the machine. It is obvious, however, that a tractor may be employed, if desired, for this purpose. Each of the plows 40 digs up a row of potatoes and on account of the inclined position of these plows, the potatoes are delivered to a shaking grate now to be described. Vertical bars 46 extend upwardly from the frame near the junction of the members 10 and 14, and these bars support a rod 48 upon which the upper ends of depending rods 50 are supported for oscillatory movement. The rods 50 extend slidably through collars 52 secured to bars 54, which constitute the side members of the frame of an upper grate. A spring 56 is interposed between each of the collars 52 and collars 58 secured to the lower ends of the rods 50 whereby the grate is yieldingly supported. To the rear ends of the frame members 54 are pivoted links 60, the upper ends of which are pivoted to arms 62 secured to the machine frame members 10.

In order to shake the grate, pitman rods 64 are connected to the lower ends of the rods 50, the other ends of the pitman rods being connected to crank arms 66 secured to stub shafts 68 journaled in the frame members 10 and in brackets 70. Secured to the shafts 68 are gears 72 meshing with gears 74 secured to the axle 21. The frame members 54 of the grate are connected by transverse bars 76 and 78, and to these bars are secured a plurality of grate bars 80 extending from the front of the grate frame to the rear thereof. Intermediate the bars 80 are bars 82 which extend only as far as the transverse bar 78. As shown in Fig. 2 the grate bars are comparatively thin and consist of a plurality of portions inclined upwardly and rearwardly at a slight angle, these portions being united by portions which incline forwardly and upwardly at a steep angle. A secondary or lower grate frame has side members 84 secured to the transverse bar 78 and also secured to a rear transverse bar 86. The members 84 are further supported from the side members 54 of the upper grate by tie bars 88 so that both grates will be operated in unison. Between the side members 84, longitudinal grate bars 90 are supported, and if desired transverse grate bars 91 may also be provided. The grate bars 90 are constructed similarly to the grate bars 80 and 82 previously described, and as shown in Fig. 4 the bars 90 are spaced apart a comparatively small distance. The upper grate is constructed with the grate bars close together at the front portion, while at the rear portion, which extends over the secondary grate, the bars are spaced considerably further apart. The rear portion of the upper grate is provided with transverse bars 93 which prevent vines and weeds from dropping through the grate. The grate bars 90 deliver at the rear to a receptacle 95 having a bottom 92 inclined downwardly toward the middle portion at each side. An elevator frame 94 is secured to the rear of the machine by strips 96 and brace rods 98, and this frame is provided with rollers 100 and 102 at the top and bottom, respectively, over which runs an endless carrier 104 provided with slats 106. The shaft of the roller 102 is provided with a sprocket wheel over which runs a sprocket chain 110 driven from a sprocket wheel 112 secured to one of the stub shafts 68. The lower end of the carrier 104 runs adjacent the bottom of the receptacle 95, and the top of the carrier delivers into a hopper 114 to which is attached a chute 116 which inclines downwardly and is adapted to discharge into a wagon 118 which may be driven or pulled along in proper position for this purpose. Horses for pulling the wagon may be tied to rods 120 or 121 adapted to be attached to either side of the machine frame. In order that the chute may deliver at either side it has a swivel connection 122 with the hopper. A V-shaped deflector 124 located at the rear of the upper grate prevents vines, weeds and large pieces of dirt from getting into the elevator. A seat 126 for the driver is secured to the frame of the machine within reach of the handle 36, and a foot rest is shown at 128. The wagon 118 is provided with an adjustable seat 130 for a person who may throw out stones which are delivered to the wagon, and he may also throw cut potatoes into sacks 132, which are positioned to receive small potatoes in a manner now to be described. The chute 116 has a portion of its bottom provided with a screen made up of parallel slats 134 running lengthwise and spaced the proper distance to insure that all of the potatoes delivered to the wagon will grade No. 1. The small potatoes which fall through the screen are delivered by a hopper 136 to the sacks 132, the hopper extending out to the side of the chute 116 and having an open portion at 138 so that the person in the wagon may throw any cut potatoes delivered to the wagon into the hopper 136. The sacks are attached to the lower end of the hopper and rest upon a depending support 139. The delivery end of the chute 116 is provided with a telescoping member 140, the side pieces of which are slidably supported on the side piece of the chute proper by bracket members 142. By pulling out or pushing in the telescoping member the position at which the potatoes are delivered into the wagon may be varied.

The operation and advantages of my invention will be readily understood from the foregoing description. The wheel 22 runs between two rows of potatoes both of which are plowed up by the inclined disk plows 40, the potatoes being delivered to the shaking grate bars 80 and 82, which are set close enough together to prevent potatoes of any size dropping through, but which will permit grass, short weeds and dried potato vines to fall through. On account of the particular formation of the grate bars, the potatoes are moved toward the rear, and on account of the shaking action of the grate dirt will be separated from the potatoes and will drop between the bars. When the potatoes reach the portion of the upper grate which is over the lower grate they will drop through upon the lower grate, which, on account of its shaking action, will separate particles of dirt not already removed.

The potatoes are discharged from the rear end of the lower grate into the receptacle having its bottom inclined toward the middle and are removed from this receptacle by the endless conveyer and delivered to the wagon. The vines and weeds continue to the rear end of the upper grate until they reach the deflector, from which they are discharged at each side of the conveyor. On account of the upper grate being yieldingly supported by the springs 56, it is obvious that when the grate is heavily loaded with the material delivered thereto by the disk plows, the springs will be compressed. The grate, therefore, will move downwardly toward the ends of the rods 50 and the shaking action of the grate will be increased in proportion to the amount of downward movement. The potatoes are thus freed from dirt even when the grate is heavily loaded. By providing means to which the horses drawing the wagon may be tied, I not only insure that the wagon shall be correctly positioned with relation to the harvester, but the person who would otherwise drive the horses attached to the wagon is freed so that he can pick out any stones, lumps of dirt and cut potatoes that are delivered to the wagon.

I claim:

1. A device of the character described comprising a support, a grate mounted on said support, and means for imparting to said grate a shaking action which varies in proportion to the amount of material deposited thereon.

2. A device of the character described comprising a support, a grate mounted on said support, springs upon which said grate rests, pivoted rods with which said grate is slidably associated so that said grate may move away from the fulcrum of said rods in proportion to the amount of material carried by said grate, and means for oscillating said rods.

3. A device of the character described comprising a support, a grate mounted on said support, springs upon which the forward portion of said grate rests, rods pivotally supported above said portion of the grate, said grate having sliding connection with said rods which permits movement away from the fulcrum of said rods as the load on the grate increases, pitman rods attached to the lower ends of said rods, crank arms to which said pitman rods are attached, and means for rotating said crank arms.

4. A device of the character described comprising a support, a grate mounted on said support, the front portion of said grate being composed of grate bars relatively close together and the rear portion of said grate being composed of grate bars relatively far apart, a second grate underneath said rear portion, said second grate being composed of grate bars relatively close together, and means for shaking both of said grates.

5. A device of the character described comprising a support, a grate mounted on said support, the front portion of said grate being composed of longitudinal grate bars relatively close together, the rear portion of said grate being composed of longitudinal grate bars spaced relatively far apart and also being provided with a plurality of transverse bars, a deflector located at the rear end of said grate, a second grate underneath the rear portion of the first mentioned grate, said second grate being secured to the first mentioned grate and being composed of grate bars relatively close together, and means for shaking both of said grates.

In testimony whereof I hereunto affix my signature.

ROBERT W. MUIR.